(12) United States Patent
Jean et al.

(10) Patent No.: US 9,455,555 B2
(45) Date of Patent: *Sep. 27, 2016

(54) WIRE STRINGING ANGLE CLAMP

(71) Applicant: Marmon Utility, LCC, Milford, NH (US)

(72) Inventors: Leonard P. Jean, Melbourne, FL (US); Brian Boisclair, Goffstown, NH (US); Jared Argyle, Amherst, NH (US); Bob Biddle, Amherst, NH (US); Edward Laughlin, Lowell, MA (US); Javier Philbrick, Nashua, NH (US)

(73) Assignee: Marmon Utility LLC, Milford, NH (US)

(*) Notice: Subject to any disclaimer, the term of this patent is extended or adjusted under 35 U.S.C. 154(b) by 256 days.

This patent is subject to a terminal disclaimer.

(21) Appl. No.: 14/474,562

(22) Filed: Sep. 2, 2014

(65) Prior Publication Data

US 2014/0367623 A1 Dec. 18, 2014

Related U.S. Application Data

(63) Continuation-in-part of application No. 13/768,668, filed on Feb. 15, 2013, now Pat. No. 8,820,715.

(60) Provisional application No. 61/601,813, filed on Feb. 22, 2012.

(51) Int. Cl.
*B63B 35/03* (2006.01)
*H02G 1/04* (2006.01)

(52) U.S. Cl.
CPC ..................... *H02G 1/04* (2013.01)

(58) Field of Classification Search
CPC ............ H02G 1/02; H02G 1/04; H02G 1/08; H02G 7/00; H02G 7/02; H02G 7/04; H02G 7/12; G02B 6/48; G02B 6/4422; B66D 1/00; B66D 1/005; B66D 1/04; B25B 25/00
See application file for complete search history.

(56) References Cited

U.S. PATENT DOCUMENTS

| 3,561,708 | A | 2/1971 | Dubey |
| 3,592,426 | A | 7/1971 | Dubey |
| 3,834,674 | A | 9/1974 | Jackson |
| 5,195,704 | A | 3/1993 | Louie |
| 5,533,710 | A | 7/1996 | Sauber et al. |

(Continued)

FOREIGN PATENT DOCUMENTS

| JP | 07322436 A | 12/1995 |
| JP | 10243513 A | 9/1998 |

(Continued)

*Primary Examiner* — Monica Carter
*Assistant Examiner* — Nirvana Deonauth
(74) *Attorney, Agent, or Firm* — Hayes Soloway, P.C.

(57) ABSTRACT

A stringing angle clamp device and methods associated therewith are provided. The stringing angle clamp device has a pulley wheel rotatable about an axle. A connecting structure has at least a first end and a second end, the first end rotatably affixed to the axle and the second end sized to connect to a utility pole. A first guide arm is rotatably affixed to the axle, wherein the first guide arm further comprises a first arm half and a second arm half, wherein the first arm half is mechanically fastened to the second arm half with at least one removable mechanical fastener positioned through each of the first and second arm halves. A first wire clamping structure is affixed to the first guide arm.

20 Claims, 9 Drawing Sheets

(56) References Cited

U.S. PATENT DOCUMENTS

| | | |
|---|---|---|
| 5,639,068 A | 6/1997 | Johnson |
| 6,517,052 B1 | 2/2003 | Lake |
| 7,387,294 B2 | 6/2008 | Kwon |
| 7,692,100 B2 | 4/2010 | Boisclair |
| 2005/0238311 A1 | 10/2005 | Forrester |
| 2010/0012351 A1 | 1/2010 | Boisclair |
| 2010/0018014 A1 | 1/2010 | Boisclair |
| 2011/0259633 A1* | 10/2011 | Venne ............... H02G 1/04 174/45 R |

FOREIGN PATENT DOCUMENTS

| | | |
|---|---|---|
| JP | 2002199568 A | 7/2002 |
| WO | 2004064215 A1 | 7/2004 |

* cited by examiner

500

| A stringing angle clamp device is connected to the utility pole, the stringing angle clamp having a pulley wheel rotatable about an axle, a first guide arm rotatably affixed to the axle, and a first wire clamping structure affixed to the first guide arm, wherein the first guide arm further comprises a first arm half and a second arm half, wherein the first arm half is mechanically fastened to the second arm half with at least one removable mechanical fastener positioned through each of the first and second arm halves | — 502 |

| The wire is strung on the first wire clamping structure, wherein a portion of the wire contacts the pulley wheel and wherein a portion of the wire is positioned between the first arm half and the second arm half of the first guide arm | — 504 |

| The wire is retained with the first wire clamping structure | — 506 |

FIG. 9

WIRE STRINGING ANGLE CLAMP

CROSS REFERENCE TO RELATED APPLICATION

This application is a continuation-in-part of U.S. application Ser. No. 13/768,668 entitled, "Wire Stringing Angle Clamp" filed Feb. 15, 2013, which claims benefit of U.S. Provisional Application Ser. No. 61/601,813, entitled, "Wire Stringing Angle Clamp" filed Feb. 22, 2012, the entire disclosures of which is incorporated herein by reference.

FIELD OF THE DISCLOSURE

The present disclosure is generally related to overhead transmission and distribution systems and more particularly is related to a wire stringing angle clamp used in overhead transmission and distribution systems.

BACKGROUND OF THE DISCLOSURE

Messenger wires used in overhead transmission and distribution systems need to be strung with temporary stringing devices which are replaced with permanent retention devices. Overhead conductor cables are commonly suspended from a messenger wire typically made of high strength alloys. The messenger wire is supported on poles or towers with the conductor cable spacers arranged at spaced intervals along the messenger wire to suspend one or more conductor cables. Installation of the messenger wire is a tedious and expensive process, since it conventionally requires the use of numerous different installation devices, and then an exchanging of the installation devices for permanent retention devices. For example, a utility worker installing a messenger wire will have to first install the installation devices, then string the messenger wire through the installation devices, and then go back to each of the installation devices and replace it with a permanent retention device. Additional steps such as tensioning the messenger cable with a winch or pulley, conventionally known as a come-along, may be needed as well.

The use of these many installation and permanent retention components comes at a high cost to utility companies. These costs, coupled with the expense in man hours for installation of the messenger wire adds significant costs to the operational budgets of the utility companies, which is passed along to the consumer in the form of higher utility bills. Furthermore, if a messenger wire becomes dislodged during the tensioned transfer process, the potential for accidents and injuries while installing the messenger wires and changing out temporary devices for permanent devices is significant, as messenger wires may be under high tension force.

Thus, a heretofore unaddressed need exists in the industry to address the aforementioned deficiencies and inadequacies.

SUMMARY OF THE DISCLOSURE

Embodiments of the present disclosure provide a system and method for stringing angle clamp device. Briefly described, in architecture, one embodiment of the system, among others, can be implemented as follows. The stringing angle clamp device has a pulley wheel rotatable about an axle. A connecting structure has at least a first end and a second end, the first end rotatably affixed to the axle and the second end sized to connect to a utility pole. A first guide arm is rotatably affixed to the axle, wherein the first guide arm further comprises a first arm half and a second arm half, wherein the first arm half is mechanically fastened to the second arm half with at least one removable mechanical fastener positioned through each of the first and second arm halves. A first wire clamping structure is affixed to the first guide arm.

The present disclosure can also be viewed as providing a method of stringing and retaining a wire on a utility pole. In this regard, one embodiment of such a method, among others, can be broadly summarized by the following steps: connecting a stringing angle clamp device to the utility pole, the stringing angle clamp having a pulley wheel rotatable about an axle, a first guide arm rotatably affixed to the axle, and a first wire clamping structure affixed to the first guide arm, wherein the first guide arm further comprises a first arm half and a second arm half, wherein the first arm half is mechanically fastened to the second arm half with at least one removable mechanical fastener positioned through each of the first and second arm halves; stringing the wire between the first wire clamping structure, wherein a portion of the wire contacts the pulley wheel and wherein a portion of the wire is positioned between the first arm half and the second arm half of the first guide arm; and retaining the wire with the first wire clamping structure.

The present disclosure can also be viewed as providing an apparatus for angularly retaining a wire. In this regard, one embodiment of such an apparatus, among others, may be implemented as follows. The apparatus for angularly retaining a wire has a pulley wheel rotatable about an axle. A connecting structure is connected to the axle and securing the pulley wheel a substantially stationary distance from a utility pole. A first guide arm is connected to the axle and positioned in a first direction, wherein the first direction is between 90° and 175° from a direction of the wire on an opposing side of the axle, wherein the first guide arm further comprises a first arm half and a second arm half, wherein the first arm half is mechanically fastened to the second arm half with at least one removable mechanical fastener positioned through each of the first and second arm halves. A first wire clamping structure is affixed to the first guide arm, wherein the wire is forcibly retained by the first wire clamping structure.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIG. 9 is a flowchart illustrating a method of stringing and retaining a wire on a utility pole in accordance with the first exemplary embodiment of the disclosure.

DETAILED DESCRIPTION

Figure 1:
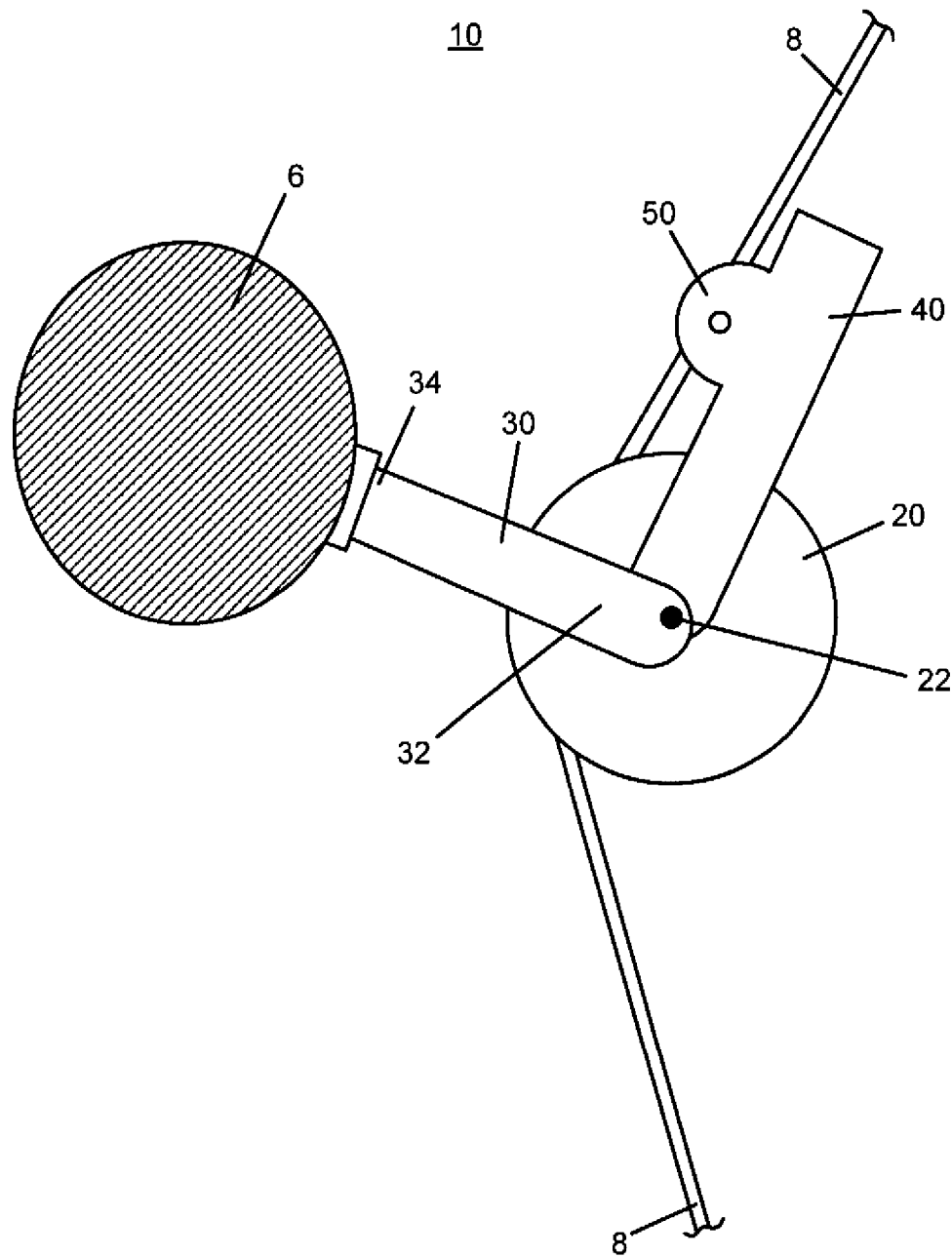
FIG. 1 is a top view illustration of a stringing angle clamp device, in accordance with a first exemplary embodiment of the present disclosure.

FIG. 1 is a top view illustration of a stringing angle clamp device 10, in accordance with a first exemplary embodiment of the present disclosure. The stringing angle clamp device 10, which may be referred to herein simply as 'device 10' includes a pulley wheel 20 rotatable about an axle 22. A connecting structure 30 has at least a first end 32 and a second end 34, wherein the first end 32 is rotatably affixed to the axle 22 and the second end 34 is sized to connect to a utility pole 6. A first guide arm 40 is rotatably affixed to the axle 22. A first messenger wire clamping structure 50 is affixed to the first guide arm 40.

As is shown in FIG. 1, the device 10 is used with stringing and retaining a messenger wire 8 commonly used with utility transmission, distribution, or conducting cables. The messenger wire 8, which may also be known in the industry as a messenger cable or a catenary, is a durable wire structure that is used to support cable, such as a conductor cable or transmission and distribution cables. Commonly, the cables are suspended or affixed to the messenger wire 8 and the messenger wire 8 is retained between utility poles 6, utility towers and other structures, such as buildings or other infrastructure, where the messenger wire 8 is arranged at intervals to suspend one or more conductor cables. The messenger wire 8 may be constructed from many different materials, or combinations there, but may commonly be constructed from high strength steel wire, other high strength alloys, or a similar material that has high strength characteristics and is durable under many weather conditions. Although the messenger wire 8 is often distinct and separate from a cable, it may be formed as an integral part of the cable. In accordance with this disclosure, the wire 8 may include any type of wire, self-supporting or used to support another cable.

The device 10 may be used during both the installation of the messenger wire 8 and to retain the messenger wire 8 in an installed position for an indefinite period of time, such as for the months or years the conductor cable may be in place. Conventional systems include those used to string messenger wires 8 and those used to retain the messenger wire 8 in place for the indefinite period of time. However, since two devices are needed to complete installation, i.e., an installation device and a permanent retaining device, installing new messenger wires 8 is a costly and inefficient process. After the messenger wire 8 is strung through the conventional installation device, a utility worker must remove the installation device and replace it with a permanent retaining device. Ultimately, this increases the time and expense for installing messenger wires 8.

One of the many benefits of the device 10 disclosed herein is that it can save both time and money by allowing for faster installation of the messenger wire 8 and by retaining the messenger wire 8 in the installed position permanently. With reference to FIG. 1 and described in further detail in the additional figures, during installation of the messenger wire 8, a first end of the messenger wire 8 may be strung through the first messenger wire clamping structure 50 of the first guide arm 40. The messenger wire 8 may then be wrapped around a portion of the pulley wheel 20 and extend in a direction away from the pulley wheel 20 on an opposing side of the axle 22 from the first arm 40. The messenger wire 8 may also be strung to any additional number of devices 10 or utility poles 6, or other components affixed to the device 10. Once the position of the messenger wire 8 is achieved, the first messenger wire clamping structure 50 may be clamped or tightened to retain the messenger wire 8 in place within the device 10. The device 10 may then hold and support the messenger wire 8 for an indefinite period of time.

The device 10 may be affixed to any type of utility pole 6 or utility tower with the connecting structure 30. The connecting structure 30 may include any type of structure or device that holds the pulley wheel 20 in a position proximate to the utility pole 6. The connecting structure 30 may be affixed to the pulley wheel 20 with the axle 22 at the first end 32, and connected or fastened to the utility pole 6 on the second end 34 of the connecting structure 30. Of course, the second end 34 of the connecting structure 30 may be connected or affixed to another structure or device that is connected to the utility pole 6, such as a cross arm or other securing structure. The second end 34 of the connecting structure 30 may include a variety of designs and structures for connecting to the utility pole 6 in a number of ways. For example, as is discussed further in FIG. 5 the second end 34 may include a forked portion with a pin that connects to a metal bracket bolted to the utility pole 6.

Generally, the second end 34 of the connecting structure 30 is connected to the utility pole 6 such that it retains the pulley wheel 20 and axle 22 in a location having a substantially predetermined distance from the utility pole 6. In other words, the connecting structure 30 may be connected to the utility pole 6 with a movable connection, such as one that pivots, but the distance between the utility pole 6 and the pulley wheel 20 remains substantially constant. This may allow the device 10 to be oriented in a particular direction during installation or after installation while at the same time ensuring that the device 10 is securely connected to the utility pole 6. All designs and variations of the connecting structure 30 including those not explicitly discussed herein are considered within the scope of the present disclosure.

The pulley wheel 20 and axle 22 may be retained on the first end 32 of the connecting structure 30. The pulley wheel 20 is rotatable about the axle 22, such that it can freely rotate without substantial hindrance due to friction or other forces. For example, the axle 22 may be a bolt or other structure that is positioned within an opening at a center point of the pulley wheel 20. The first end 32 of the connecting structure 30 may have one or more holes located therein which the axle 22 can traverse through. The connection points between the first end 32 of the connecting structure 30 and the axle 22, as well as between the pulley wheel 20 and the axle 22 may all be easily movable, such that all components of the device 10 rotate about the axle 22. However, the connecting structure 30 or another component of the device 10 may be retained to the axle 22 in a non-rotatable manner, depending on design.

The first guide arm 40 may be used to guide the messenger wire 8 and support the first messenger wire clamping structure 50. The first guide arm 40 may be rotatable with respect to the axle 22, such that the first guide arm 40 can be oriented at desired angles from each other. For example, the first guide arm 40 may commonly be used with an orientation of approximately 90° to 175°, as measured from the first guide arm 40 past the axle 22 between a central axis parallel to a direction of the wire 8 on an opposing side of the axle 22. This position may correspond to an angle in the stringing of the conductor cable between utility poles 6 with an angle of 90° to 175° therebetween. Of course, the device 10 may be used with angles over 175° or angles less than 90°. Generally, a common messenger stringing clamp may be used for angles between 175° and 180°, and it is rare to string cable at angles less than 90°.

The first messenger wire clamping structure 50 is positioned on the first guide arm 40. The first messenger wire clamping structure 50 may include any type of clamping structure or wire clamp, such as a clamp having two opposing structures that may be biased or retained proximate to one another. The first messenger wire clamping structure 50 may have at least an open position where the messenger wire 8 can be inserted into the first messenger wire clamping structure 50, and a closed position where the messenger wire 8 is forcibly retained within the first messenger wire clamping structure 50. For example, the first messenger wire clamping structure 50 may include a fastener, such as a threaded bolt and nut, which can be used to place the first messenger wire clamping structure 50 in the closed position. Any additional variations, components or features not explicitly disclosed herein may be included with the device 10.

Figure 2:
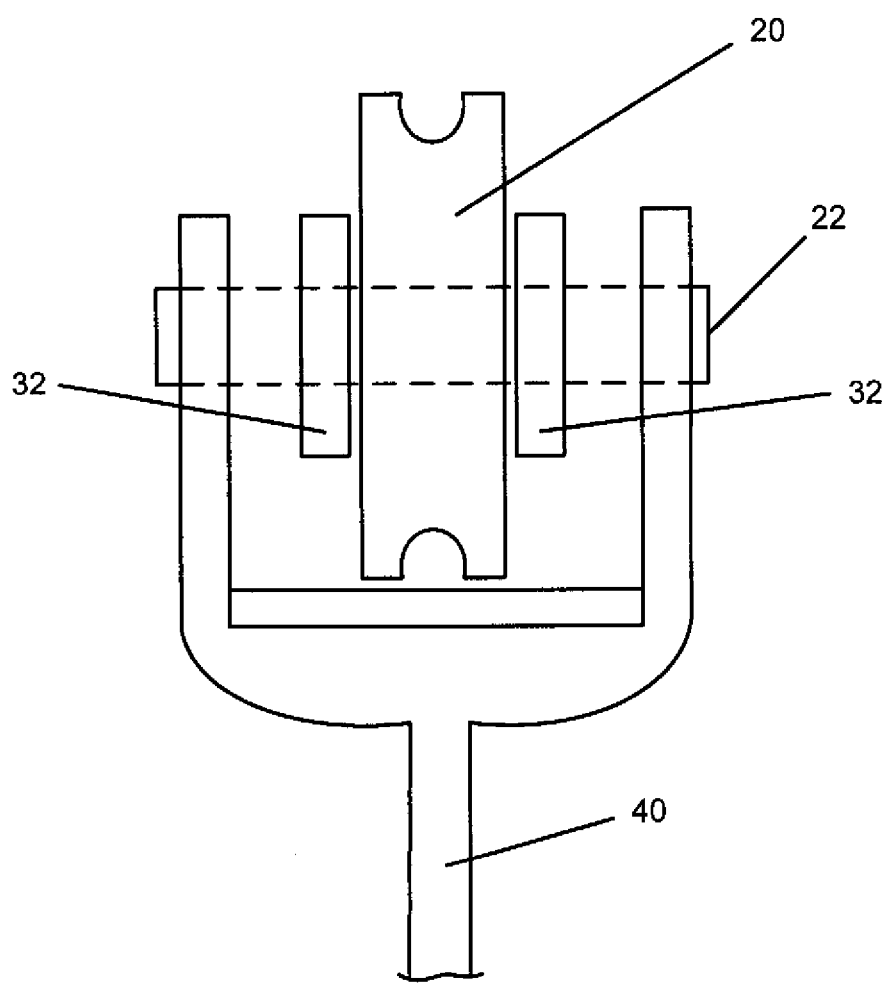
FIG. 2 is a cross-sectional illustration of the stringing angle clamp device of FIG. 1, in accordance with the first exemplary embodiment of the present disclosure.

FIG. 2 is a cross-sectional illustration of the stringing angle clamp device 10 of FIG. 1, in accordance with the first exemplary embodiment of the present disclosure. As is shown, the device 10 includes the pulley 20 and the axle 22 with the connecting structure 30 (FIG. 1) and the first guide arm 40 rotatably affixed to the axle 22. The first guide arm 40 and the connecting structure 30 have forked end sections where they are contacting the axle 22 (only the first end 32 of the connecting structure 30 is shown). This feature allows the connecting structure 30 and the first guide arm 40 to contact and attach to the axle 22 at two points along the axle 22 with the pulley wheel 20 positioned interior to each of the contacting structure 30 and the first guide arm 40.

When the messenger wire 8 is fully installed with the device 10, the messenger wire 8 may be strung on the first messenger wire clamping structure 50, across the pulley wheel 20, and extend in a direction away from the pulley wheel 20 on an opposing side of the axle 22 from the first arm 40. The angle of the first guide arm 40 may dictate how much of the pulley wheel 20 is contacted by the messenger wire 8. The first messenger wire clamping structure 50 may retain the messenger wire 8 in a substantially stationary position, such that conductor cables and other utility lines may be suspended from it. As one having skill in the art can see, when the device 10 is used, there is no need for a utility worker to remove the device 10 and install any other structure, since the device 10 can be used permanently. The only modifications that may be made to the device 10 after the messenger wire 8 is strung, for example, is simply tightening the first messenger wire clamping structure 50 to retain the messenger wire 8 in a secured position.

Figure 3:
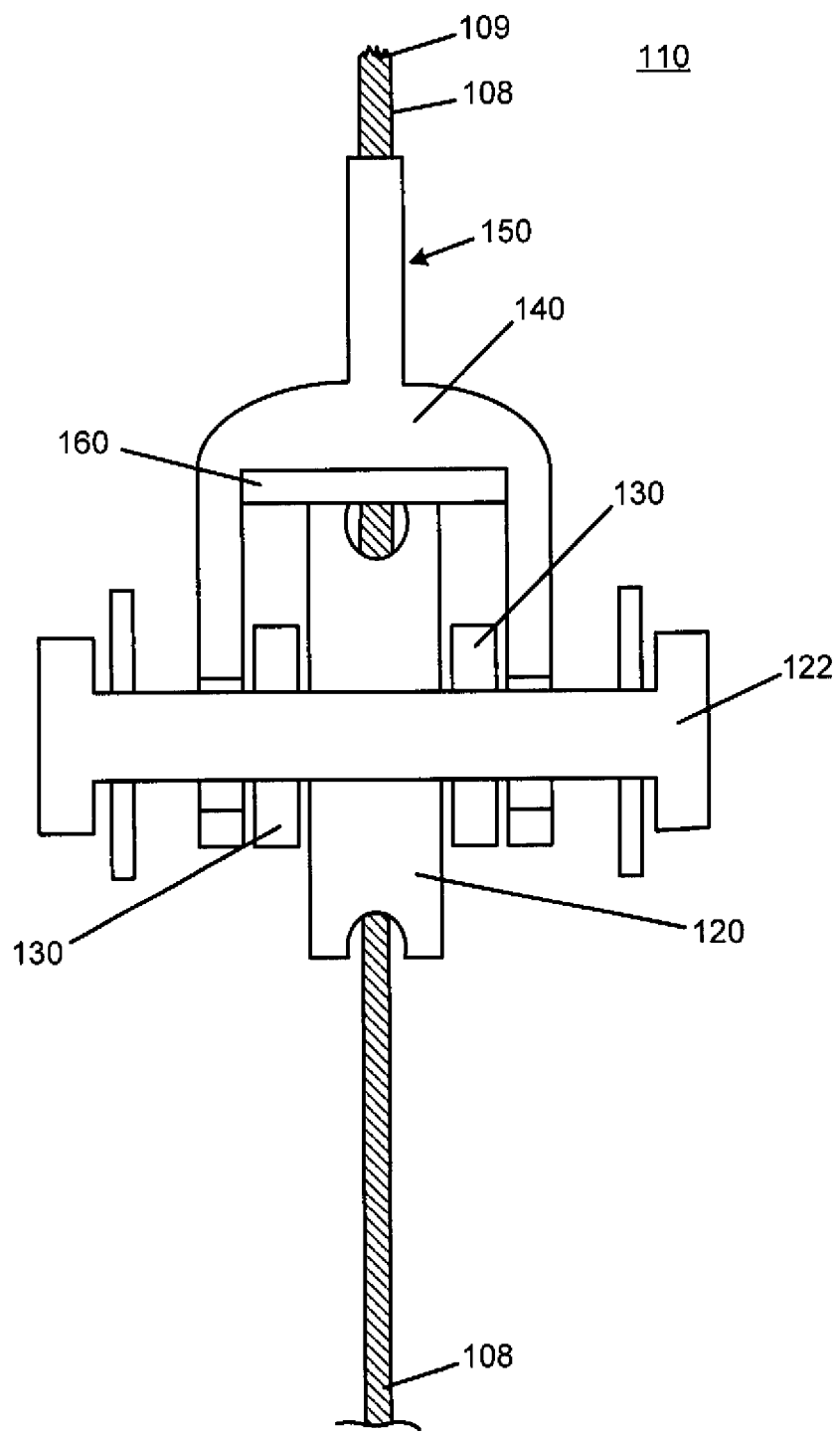
FIG. 3 is a cross-sectional illustration of a stringing angle clamp device, in accordance with a second exemplary embodiment of the present disclosure.

FIG. 3 is a cross-sectional illustration of a stringing angle clamp device 110, in accordance with a second exemplary embodiment of the present disclosure. The stringing angle clamp device 110 of the second exemplary embodiment, which may be referred to herein as 'device 110,' is substantially similar to, and may include any of the components, features and characteristics of the device 10 of the first exemplary embodiment. As is shown in FIG. 3, the device 110 includes a pulley wheel 120 rotatable about an axle 122. A connecting structure 130 is rotatably affixed to the axle 122 at a first end. A second end of the connecting structure 130 is sized to connect to a utility pole 106. A first guide arm 140 is rotatably affixed to the axle 122. A first messenger wire clamping structure 150 is affixed to the first guide arm 140.

The device 110 further includes at least a first braking structure 160 positioned on the first guide arm 140. The first braking structure 160 may include any type or sized structure that is positioned on the first guide arm 140. For example, as is shown in FIG. 3, the first braking structure 160 includes a structure positioned between the first guide arm 140 and the pulley wheel 120. The first guide arm 140 and the first braking structure 160 may be movable between at least a first position where the first braking structure 160 is not in contact with the pulley wheel 120 and a second position where the first braking structure 160 is in contact with the pulley wheel 120 (as is shown in FIG. 3 with the first guide arm 140 and the first braking structure 160).

The first braking structure 160 may be used as a self-braking system within the device 110, which may help limit movement of the messenger wire 108 in certain scenarios. For example, when a messenger wire 108 that is strung between utility poles 106 breaks, the forces from the release of the tension within the messenger wire 108 may transfer throughout the messenger wire 108, which, when combined with the weight of the messenger wire 108 and any cable supported thereon, may result in a downed messenger wire 108. To help prevent this situation, the device 110 clamps the messenger wire 108 on either side of the pulley wheel 120 with the first messenger wire clamping structure 150. As the messenger wire 108 breaks, the forces on either side of the device 110 from the messenger wire 108 will pull the messenger wire 108 along the axis of the messenger wire 108, in one direction or another depending on where the break occurs.

The first braking structure 160 may alleviate some of the forces when the messenger wire 108 breaks by frictionally hindering the movement of the pulley wheel 120. In FIG. 3, the messenger wire 108 is illustrated as having a break 109 proximate to the first guide arm 140. The resulting force within the messenger wire 108 would pull the first guide arm 140 towards the pulley wheel 120, since the messenger wire 108 is retained on the first guide arm 140 by the first messenger wire clamping structure 150. As this movement happens, the first braking structure 160 may contact the pulley wheel 120, thereby applying a frictional load to the pulley wheel 120 which will hinder the rotation of the pulley wheel 120. Although this may not prevent all movement of the messenger wire 108 within the device 110, it may substantially reduce the movement of the messenger wire 108, which may in turn lessen any damage that is likely to occur.

The first braking structure 160 may include many different variations to enhance or adjust the type of braking or braking force applied to the pulley wheel 120. For example, the pulley wheel 120 may have a plurality of teeth formed along the circumference of the pulley wheel 120 which the first braking structure 160 may engage when the messenger wire 108 breaks. This feature may prevent substantially all movement within the pulley wheel 120 from the direct contact of the first braking structure 160 with the teeth, as opposed to only hindering movement of the pulley wheel 120 from a frictional load. Other variations may include using high-friction materials at all contacting surfaces between the pulley wheel 120 and the first a braking structure 160.

Figure 4:
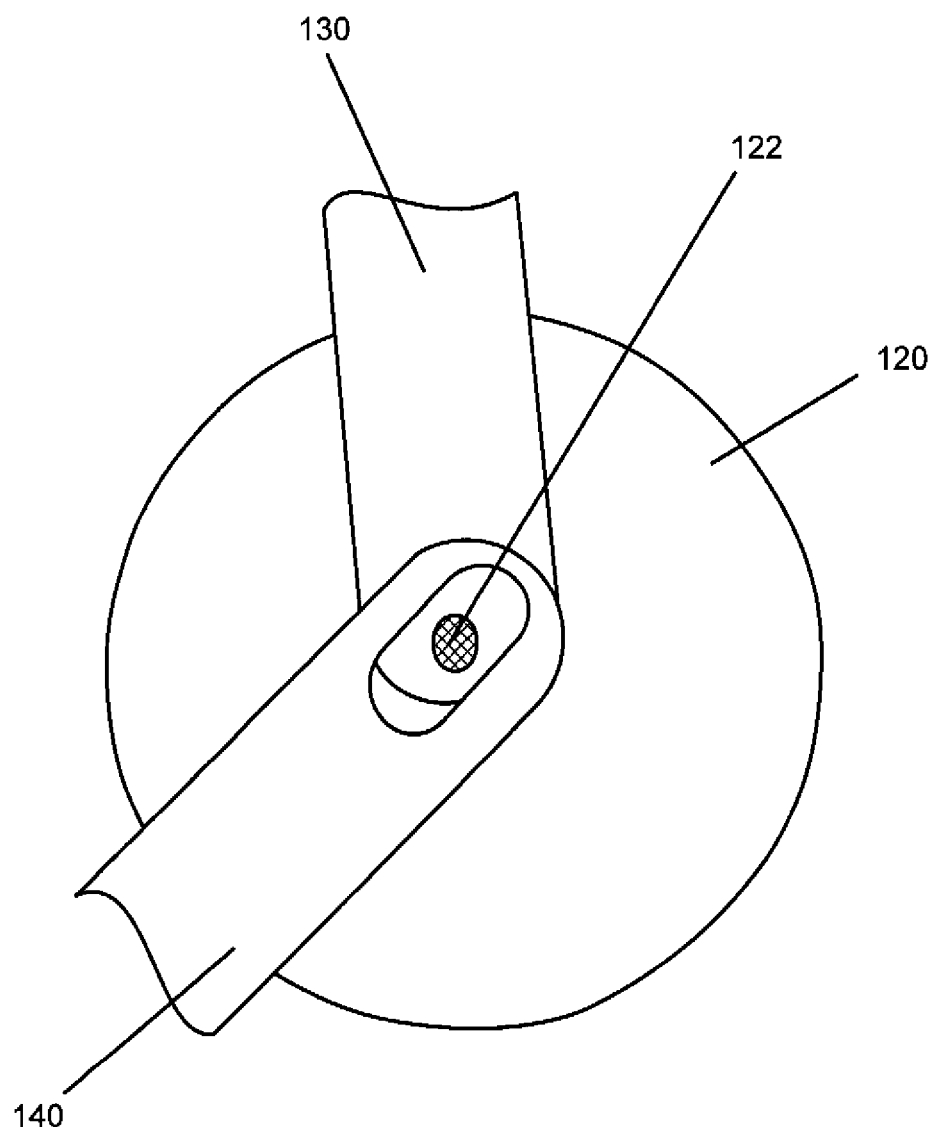
FIG. 4 is a top view illustration of the pulley wheel and axle of the stringing angle clamp device of FIG. 3, in accordance with the second exemplary embodiment of the present disclosure.

FIG. 4 is a top view illustration of the pulley wheel 120 and axle 122 of the stringing angle clamp device 110 of FIG. 3, in accordance with the second exemplary embodiment of the present disclosure. Movement of the first braking structure 160 in contacting the pulley wheel 120 may be controlled by the movement of the first guide arm 140. Movement of the first guide arm 140 may be controlled based on the connection between the first guide arm 140 and the axle 122. As is shown in FIG. 4, the axle 122 may be positioned within a hole in the first guide arm 140, as well as the connecting structure 130. The connecting structure 130 may have a substantially circular hole, or any other type of hole, since it merely rotates around the axle. The first guide arm 140, however, may have a hole that allows for rotational movement about the axle 122 and lateral movement towards and away from the axle 122. This lateral movement allows the first guide arm 140 to move between the first position where the first braking structure 160 on the first guide arm 140 does not contact the pulley wheel 120, and the second position where the first braking structure 160 on the first guide arm 140 contacts the pulley wheel 120.

The hole within the first guide arm 140 may be shaped in a variety of ways to allow for the lateral movement of the first guide arm 140. As is shown, the shape of the hole may be a stadium hole, also referred to as 'stadium' or 'stadium circle,' which is a shape having two half circles joined by straight lines with concave sides on the inside. Other names for this shape include 'paper clip oval' and 'racetrack shaped.' This particular shape allows for movement of the first guide arm 140 in laterally and rotationally, but may substantially prevent movement in other directions (tolerance dependent). Other shapes that may be used include oval shaped holes, rectangular holes, or another other shape that permits the necessary movement. As one having skill in the art can see, a position of the axle 122 within the stadium hole of the first guide arm 140 may correspond to at least one of the positions, contacting or non-contacting, of the first braking structure 160 and the pulley wheel 120.

Figure 5:
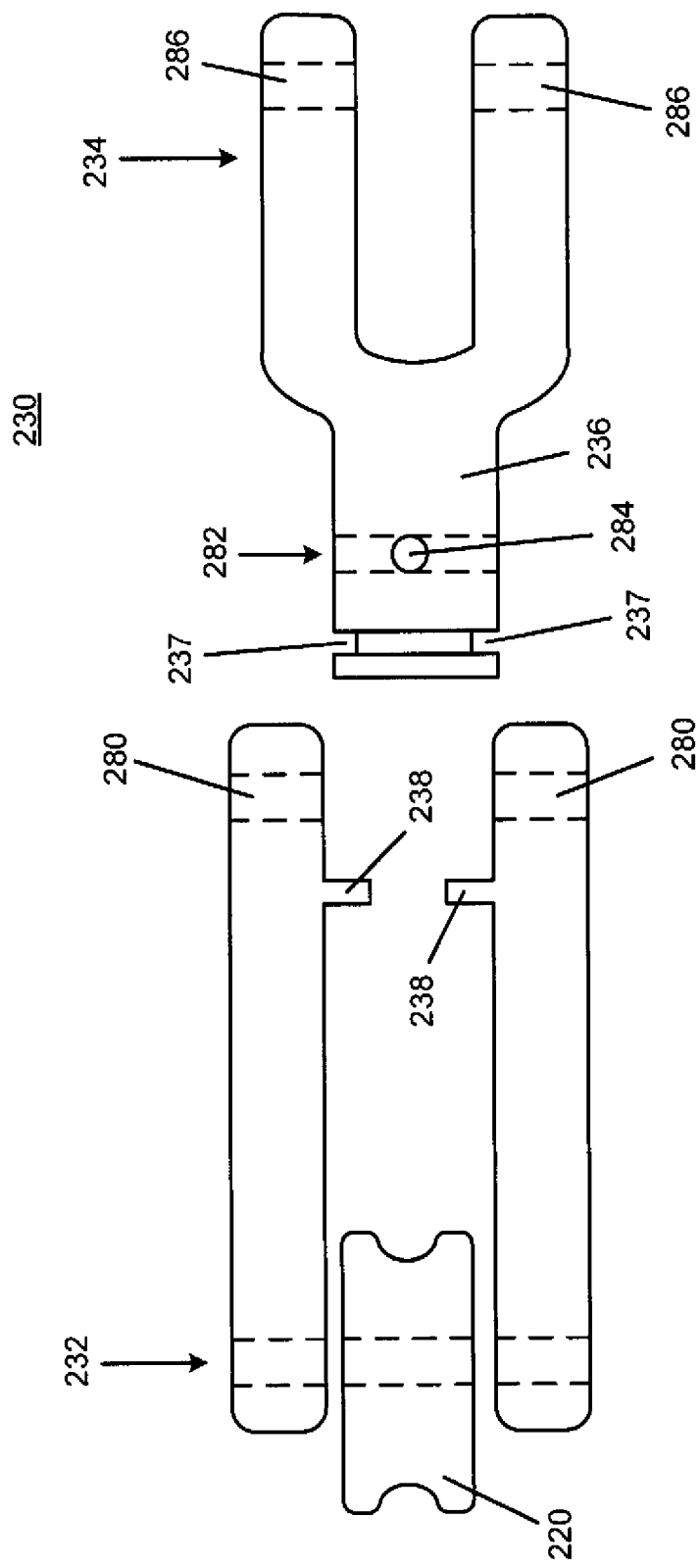
FIG. 5 is an exploded side view illustration of the connecting structure of a stringing angle clamp device, in accordance with a third exemplary embodiment of the present disclosure.

FIG. 5 is an exploded side view illustration of the connecting structure 230 of a stringing angle clamp device, in accordance with a third exemplary embodiment of the present disclosure. The connecting structure 230 of the third exemplary embodiment may be used with any of the devices of the other embodiments of the present disclosure, or any variations thereof. The connecting structure 230 has a first end 232 which connects to the pulley wheel 220 via an axle (not shown) and a second end 234 which is sized to connect to a utility pole (not shown). The second end 234 may include an adjustable connector structure 236 which allows for making adjustments in the connecting structure 230 when connecting it to the utility pole.

In particular, the adjustable connector structure 236 may have a slot engagement unit 237 which removably engages with an engagement structure 238 on the connecting structure 230. This slot engagement unit 237 and engagement structure 238 may retain the adjustable connector structure 236 to the first end 232 of the connecting structure 230. The slot engagement unit 237 may have a slot or channel that runs around the outer surface, i.e. all four sides, of the adjustable connector structure 236. This design allows the engagement structure 238 to engage with the adjustable connector structure 236 in at least four different orientations. To prevent the slot engagement unit 237 from becoming dislodged, a first hole 282 and perpendicularly intersecting second hole 284 may be formed through the adjustable connector structure 236 and a third hole 280 may be formed through a portion of the connecting structure 230 proximate to the engagement structure 238, as is shown in FIG. 5. A pin or bolt may be inserted within one of the first and second holes 282, 284, depending on the orientation of the adjustable connector structure 236, and inserted in the third hole 280 to retain the structures together appropriately.

As can be seen, the second end 234 of the connecting structure 230 has a forked section with a fourth hole 286 positioned therein, as indicated by broken lines in FIG. 5. This fourth hole 286 at the second end 234 may be used to retain the connecting structure 230 to a utility pole, or a structure on the utility, such as a metallic bracket or similar device. However, depending on the orientation of the bracket affixed to the utility pole, the adjustable connector structure 236 may have to be rotated about an axis parallel to the elongated length of the adjustable connector structure 236. This rotation will allow the fourth hole 286 to have an orientation that can correspond to a bracket on a utility pole.

The adjustability of the slot engagement unit 237 and the engagement structure 238 may allow for different orientations of the adjustable connector structure 236, thereby allowing for different ways of connecting the connecting structure 230 to a bracket on the utility pole. For example, in one orientation, the fourth hole 286 may be parallel to the third hole 280, whereas in another orientation, the fourth hole 286 may be perpendicular to the third hole 280. In this first orientation, a bolt or pin may be placed through the first hole 282 and the third hole 280 to secure the adjustable connector structure 236 to the first end 232, whereas in the second orientation, the bolt or pin may be placed through the second hole 284 and the third hole 280.

Figure 6B:
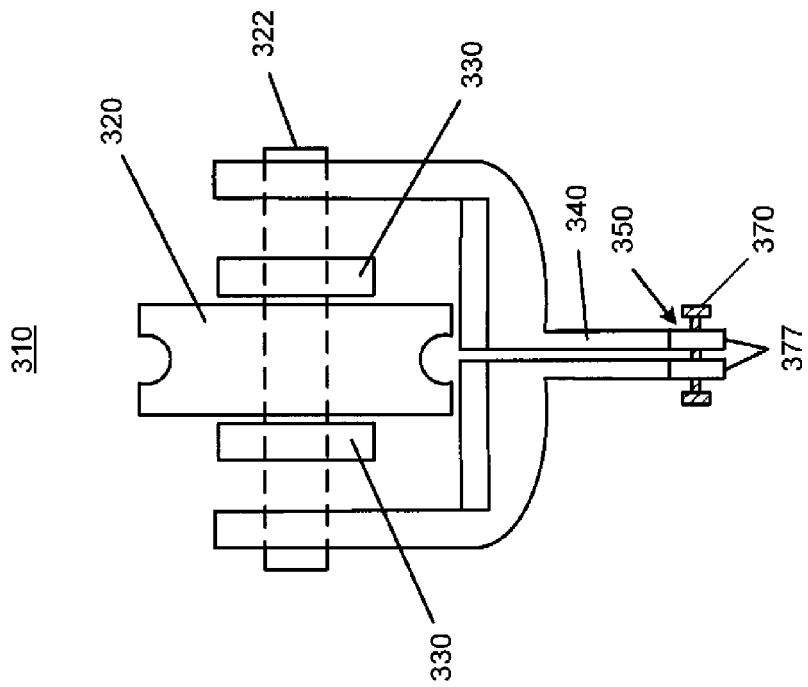
FIG. 6B is a side view illustration of a stringing angle clamp device, in accordance with the fourth exemplary embodiment of the present disclosure.
Figure 6A:
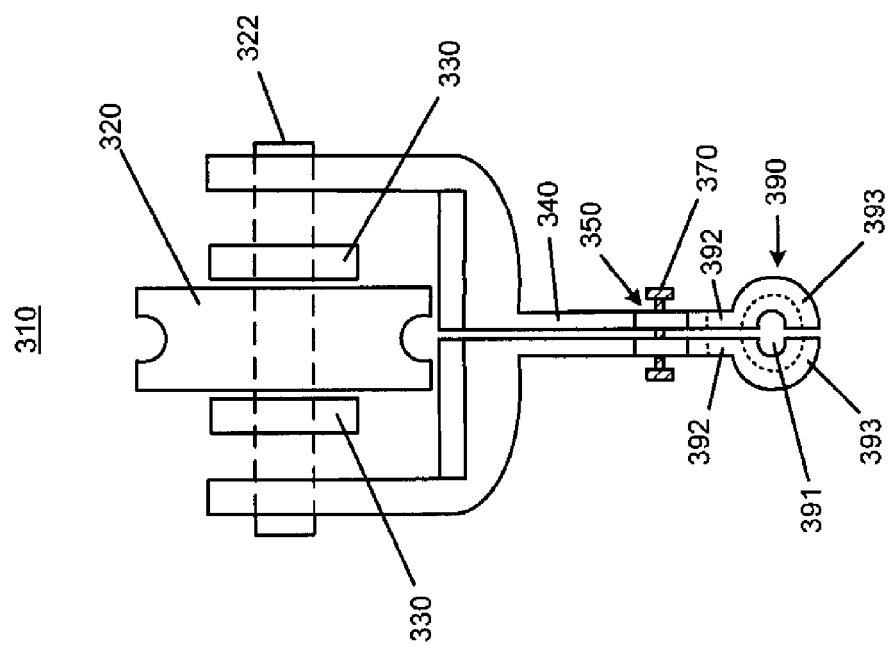
FIG. 6A is a side view illustration of a stringing angle clamp device, in accordance with a fourth exemplary embodiment of the present disclosure.

FIG. 6A is a side view illustration of a stringing angle clamp device 310, in accordance with a fourth exemplary embodiment of the present disclosure. The stringing angle clamp device 310, which may be referred to herein simply as 'device 310' may be used with any of the devices of the other embodiments of the present disclosure, or any variations thereof. The device 310 includes a pulley wheel 320 rotatable about an axle 322. A connecting structure 330 is rotatably affixed to the axle 322 at a first end and is sized to connect to a utility pole (not shown) at a second end. A first guide arm 340 is provided, wherein the first guide arm 340 has mateable arm half sections. The first guide arm 340 is rotatably affixed to the axle 322. A first messenger wire clamping structure 350 is affixed to the first guide arm 340.

As is shown in FIG. 6A, the first guide arm 340 is formed from two halves mechanically fastened together. The two halves for the first guide arm 340 may be independent of each other when they're not fastened together, and be codependent with each other when they are fastened together. A threaded fastener 370, or similar structure, may be used to fasten the halves of the first guide arm 340 together. This design allows for the first messenger wire clamping structure 350 to be integral with the first guide arm 340. Specifically, the fastener 370 which holds the halves of the first guide arm 340 together may also act as the clamping force within the first messenger wire clamping structure 350. Thus, a closed position of the fastener 370 may close the first messenger wire clamping structure 350 accordingly. This design may allow for easier installation of the messenger wire within the device 310, but still provide the necessary clamping of the messenger wire after installation is complete without a variety of additional fasteners or components.

Also shown in FIG. 6A is a support connection 390 within the first guide arm 340. The support connection 390 may be formed at a distal end of the first guide arm 340 and be used to assist with securing the device 310 in a desired location. The support connection 390 may have an openable hole 391 which is formed by the two halves of the first guide arm 340. Formed radially about the openable hole 391 may be a groove 393 and channel 392 (indicated with broken lines) which can also be used to secure the device 310. The groove 393 may be a furrow or curved indentation that is formed by edges of the support connection 390 proximate to the openable hole 391, such that the groove 393 runs radially about the openable hole 391 on both halves of the support connection 390. The channel 392 may be a passageway, such as a hole or open connection that is formed through both halves of the support connection 390 in a position between the openable hole 391 and the fastener 370, as is indicated in FIG. 6A. The channel 392 may be integral with the groove 393, thereby providing a fluid path for another structure to be placed in, such as a structure used for securing the messenger wire to the angle clamp device 310. For example, the groove 393 and channel 392 may be used to accept a device such as a helical grip to secure the messenger wire to the angle clamp device 310.

FIG. 6B is a side view illustration of a stringing angle clamp device 310, in accordance with the fourth exemplary embodiment of the present disclosure. In particular, FIG. 6B illustrates the device 310 with the first guide arm 340 being formed from two halves mechanically fastened together, similar to the design disclosed relative to FIG. 6A. However, unlike FIG. 6A, the device 310 of FIG. 6B has a terminating end 377 of each of the two halves of the first guide arm 340 proximate to the fastener 370 instead of the support connection 390 (FIG. 6A). Accordingly, the device 310 of FIG. 6B can still retain the wire between the two halves of the first guide arm 340 using the mechanical fastener 370, as disclosed relative to FIG. 6A, without the presence of the support connection 390.

Figure 7:
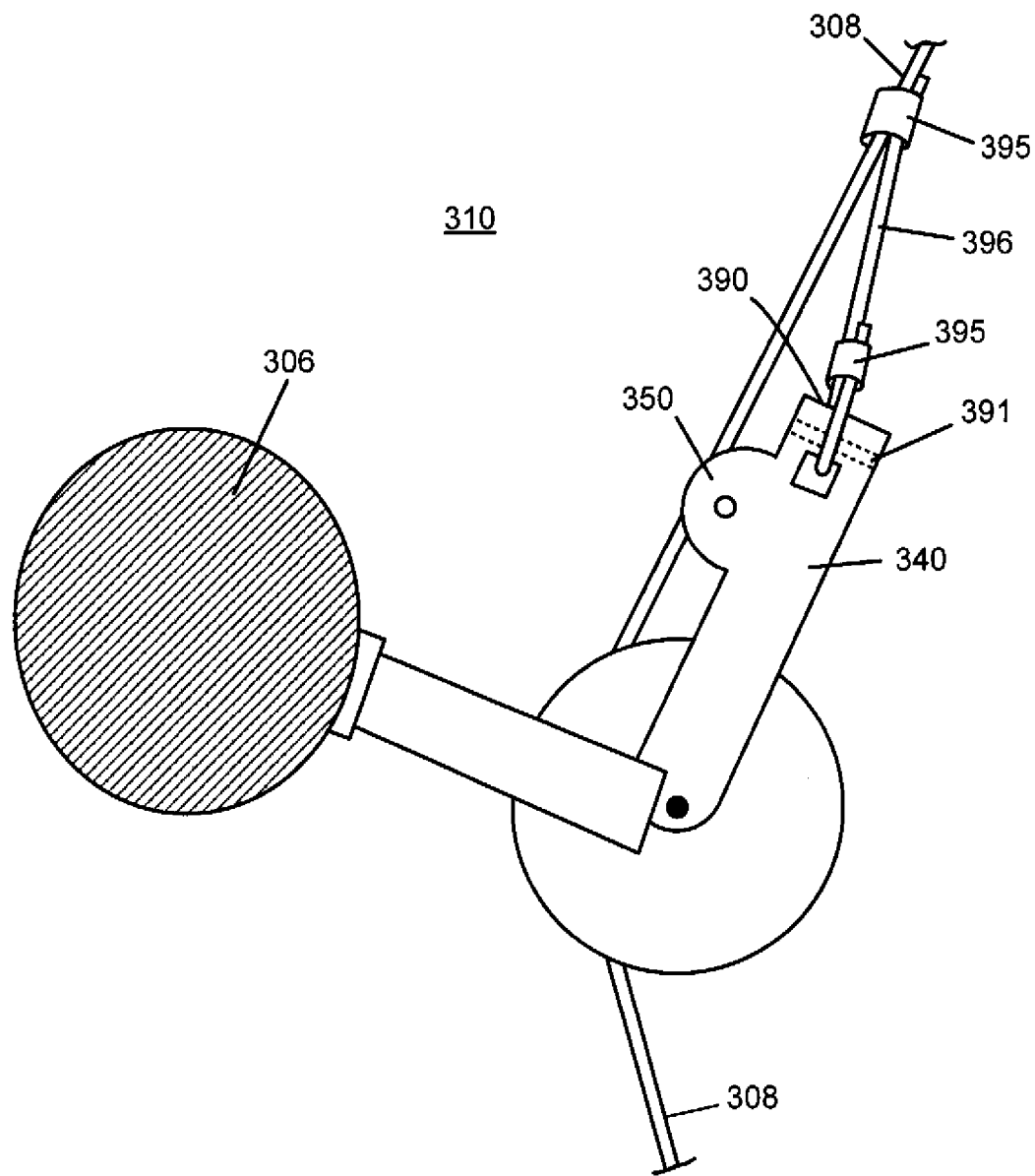
FIG. 7 is a top view illustration of a stringing angle clamp device, in accordance with the fourth exemplary embodiment of the present disclosure.

FIG. 7 is a top view illustration of a stringing angle clamp device 310, in accordance with the fourth exemplary embodiment of the present disclosure. As is shown, a messenger wire 308 may be secured by the first messenger wire clamping structure 350 and around the pulley wheel, in the same manner as described with reference to FIG. 1. In addition to the first messenger wire clamping structure 350, the messenger wire 308 may be secured with a securing device 396, such as a preformed grip, which is looped around support connection 390 and connected to the messenger wire 308. As is shown in FIG. 7, one end of the securing device 396 may be clamped with a fastener 395 to the messenger wire 308 to secure the messenger wire 308 to the angle clamp device 310. Within the industry, using a securing device 396 is to secure the messenger wire 308 may be referred to as a 'dead end'.

The other end of the securing device 396 may be looped around the support connection 390 and secured to itself, or secured to another structure. The securing device 396 may sit within the groove 393 (FIG. 6) and channel 392 formed within the two halves of the first guide arm 340, which may be angled in the direction of the messenger wire 308. When the securing device 396 is secured to itself, the securing device 396 end may be looped around the support connection 390, such that it traverses around the openable hole 391. The securing device 396 may then be affixed to itself with a fastener 395, such as a clasp or clamp. The securing device 396 may be secured in this position for an indefinite period of time, while the device 310 supports it on the utility pole 306.

Figure 8:
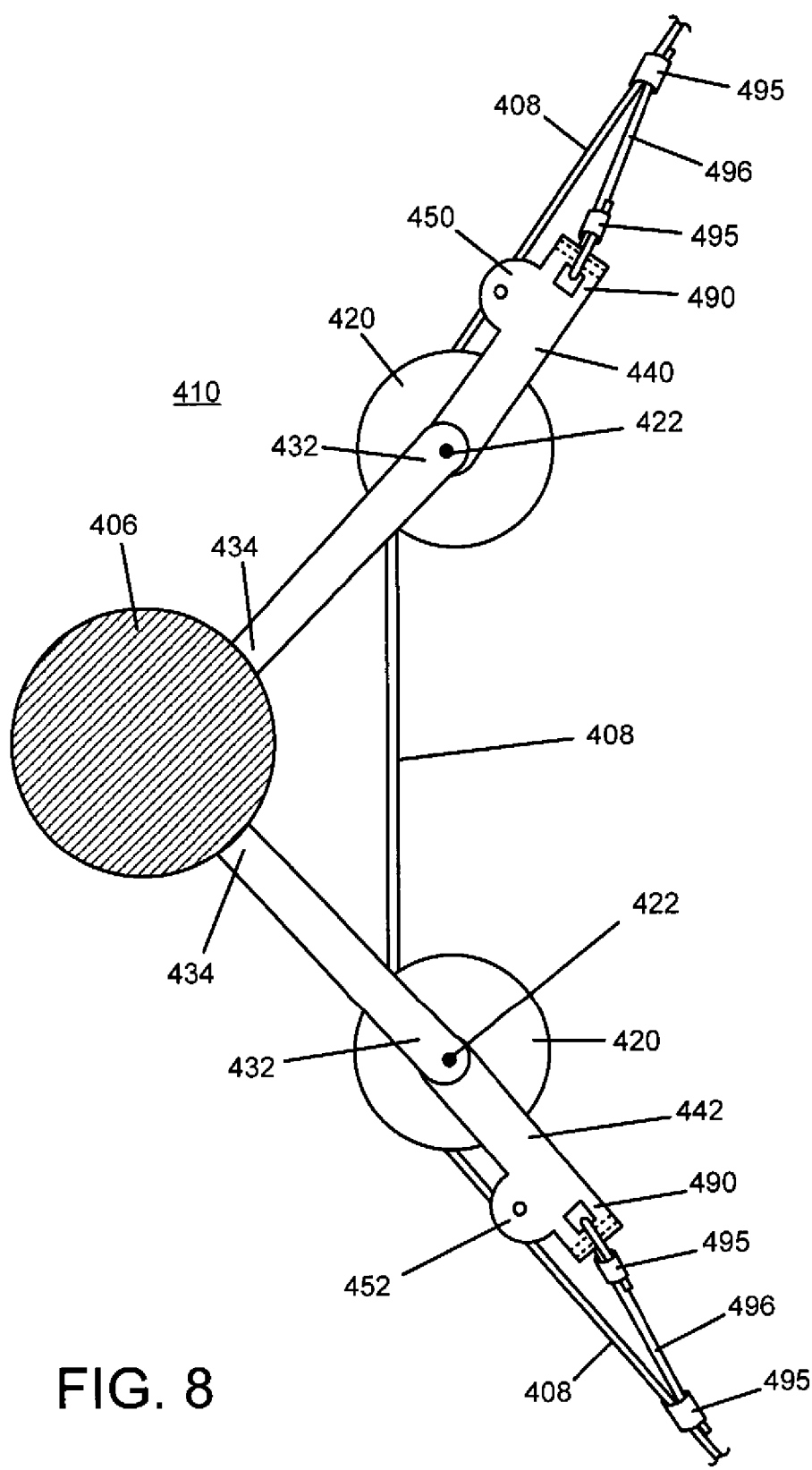
FIG. 8 is a top view illustration of two stringing angle clamp devices, in accordance with a fifth exemplary embodiment of the present disclosure.

FIG. 8 is a top view illustration of two stringing angle clamp devices 410, in accordance with a fifth exemplary embodiment of the present disclosure. The devices 410 of the fifth exemplary embodiment may be used with any of the devices of the other embodiments of the present disclosure, or any variations thereof. As is shown, each of the devices 410 includes a pulley wheel 420 rotatable about an axle 422. A connecting structure 430 has at least a first end 432 and a second end 434, wherein the first end 432 is rotatably affixed to the axle 422 and the second end 434 is sized to connect to a utility pole 406. A first guide arm 440 is rotatably affixed to the axle 422. A first messenger wire clamping structure 450 is affixed to the first guide arm 440. Similar to as described in FIG. 7, the devices 410 in FIG. 8 may utilize a dead end configuration, where a securing device 496 is secured between the support connection 490 and the messenger wire 408 with fasteners 495 to secure the messenger wire 408 to the devices 410, respectively.

As is illustrated in FIG. 8, two devices 410 may be used together on a single utility pole 406. The devices 410 may function in the same as is discussed with respect to the first exemplary embodiment. It may be necessary or desirable to use two devices 410 to string and retain a wire 408 to a utility pole 406 when the wire 408 arrives and leaves the utility pole 406. In other words, two devices 410 may be used when the angle between the two paths of the wire 408 connecting to the utility pole 406 is substantially between 90° and 120°. Accordingly, a single device 410 may be best suited for angles approximately greater than 120°. It is noted that the structures depicted in FIG. 8 may be varied.

FIG. 9 is a flowchart 500 illustrating a method of stringing and retaining a wire on a utility pole in accordance with the first exemplary embodiment of the disclosure. It should be noted that any process descriptions or blocks in flow charts should be understood as representing modules, segments, or steps that include one or more instructions for implementing specific logical functions in the process, and alternate implementations are included within the scope of the present disclosure in which functions may be executed out of order from that shown or discussed, including substantially concurrently or in reverse order, depending on the functionality involved, as would be understood by those reasonably skilled in the art of the present disclosure.

As is shown by block 502, a stringing angle clamp device is connected to the utility pole, the stringing angle clamp having a pulley wheel rotatable about an axle, a first guide arm rotatably affixed to the axle, and a first wire clamping structure affixed to the first guide arm, wherein the first guide arm further comprises a first arm half and a second arm half, wherein the first arm half is mechanically fastened to the second arm half with at least one removable mechanical fastener positioned through each of the first and second arm halves. The wire is strung on the first wire clamping structure, wherein a portion of the wire contacts the pulley wheel and wherein a portion of the wire is positioned between the first arm half and the second arm half of the first guide arm (block 504). The wire is retained with the first wire clamping structure (block 506).

It should be emphasized that the above-described embodiments of the present disclosure, particularly, any "preferred" embodiments, are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and the present disclosure and protected by the following claims.

What is claimed is:

1. A stringing angle clamp device comprising:
   a pulley wheel rotatable about an axle;
   a connecting structure having at least a first end and a second end, the first end rotatably affixed to the axle and the second end sized to connect to a utility pole;
   a first guide arm rotatably affixed to the axle, wherein the first guide arm further comprises a first arm half and a second arm half, wherein the first arm half is mechanically fastened to the second arm half with at least one removable mechanical fastener positioned through each of the first and second arm halves; and
   a first wire clamping structure affixed to the first guide arm.

2. The stringing angle clamp device of claim 1, further comprising at least a first braking structure positioned on the first guide, wherein the first and second braking structure is movable between at least a first position not in contact with the pulley wheel and a second position in contact with the pulley wheel.

3. The stringing angle clamp device of claim 2, wherein the second position of the first braking structure applies a frictional load to the pulley wheel.

4. The stringing angle clamp device of claim 2, wherein the first guide arm is rotatably affixed to the axle with a stadium hole positioned within the first guide arm.

5. The stringing angle clamp device of claim 4, wherein a position of the axle within the stadium hole corresponds to at least one of the first and second positions.

6. The stringing angle clamp device of claim 1, further comprising a wire strung on the first wire clamping structure, wherein a portion of the wire proximate to the first wire clamping structure contacts the pulley wheel.

7. The stringing angle clamp device of claim 1, wherein the at least one removable mechanical fastener is connected to the first wire clamping structure, wherein a closed position of the at least one removable mechanical fastener closes the first wire clamping structure.

8. The stringing angle clamp device of claim 1, further comprising at least one support connection within the first guide arm.

9. The stringing angle clamp device of claim 1, wherein the second end of the connecting structure is connected to the utility pole and retains the pulley wheel and axle in a location having a substantially predetermined distance from the utility pole.

10. The stringing angle clamp device of claim 6, wherein the first guide arm is positioned substantially between 90° to 175° from a direction of the wire on an opposing side of the axle.

11. The stringing angle clamp device of claim 1, further comprising an adjustable connector structure positioned at the second end of the connecting structure, wherein the adjustable connector structure is rotatable along an elongated axis of the adjustable connector structure between at least four positions, and wherein the adjustable connector structure is removably mechanically fastened in place in at least one of the at least four positions.

12. The stringing angle clamp device of claim 1, further comprising a support connection positioned on the first guide arm, the support connection having a hole and a grove and slot structure formed axially about the hole.

13. A method of stringing and retaining a wire on a utility pole, the method comprising:
    connecting a stringing angle clamp device to the utility pole, the stringing angle clamp having a pulley wheel rotatable about an axle, a first guide arm rotatably affixed to the axle, and a first wire clamping structure affixed to the first guide arm, wherein the first guide arm further comprises a first arm half and a second arm half, wherein the first arm half is mechanically fastened to the second arm half with at least one removable mechanical fastener positioned through each of the first and second arm halves;
    stringing the wire on the first wire clamping structure, wherein a portion of the wire contacts the pulley wheel and wherein a portion of the wire is positioned between the first arm half and the second arm half of the first guide arm; and
    retaining the wire with the first wire clamping structure.

14. The method of claim 13, further comprising the step of positioning the first guide arm substantially between 90° to 175° from a direction of the wire on an opposing side of the axle.

15. The method of claim 13, wherein the step of retaining the wire with the first wire clamping structure further comprises the steps of:
    applying a force on the first guide arm;
    moving the first guide arm towards the pulley wheel; and
    contacting the pulley wheel with a braking structure located on the first guide arm.

16. The method of claim 15, wherein the step of contacting the pulley wheel with the braking structure further comprises applying a frictional load to the pulley wheel.

17. An apparatus for angularly retaining a wire comprising:
    a pulley wheel rotatable about an axle;
    a connecting structure connected to the axle and securing the pulley wheel a substantially stationary distance from a utility pole;
    a first guide arm connected to the axle and positioned in a first direction, wherein the first direction is between 90° and 175° from a direction of the wire on an opposing side of the axle, wherein the first guide arm further comprises a first arm half and a second arm half, wherein the first arm half is mechanically fastened to the second arm half with at least one removable mechanical fastener positioned through each of the first and second arm halves; and
    a first wire clamping structure affixed to the first guide arm, wherein the wire is forcibly retained by the first wire clamping structure.

18. The apparatus for angularly retaining a wire of claim 17, further comprising a braking structure within the first guide arm, wherein the braking structure is biased towards a contacting position with the pulley wheel by the wire forcibly retained by the first wire clamping structure.

19. The apparatus for angularly retaining a wire of claim 18, wherein the at least one removable mechanical fastener is connected to the first wire clamping structure, wherein a closed position of the at least one removable mechanical fastener closes the first wire clamping structure.

20. The apparatus for angularly retaining a wire of claim 17, further comprising an adjustable connector structure positioned at the second end of the connecting structure, wherein the adjustable connector structure is rotatable along an elongated axis of the adjustable connector structure between at least four positions, and wherein the adjustable connector structure is removably mechanically fastened in place in at least one of the at least four positions.

* * * * *